Sept. 2, 1969　　　　C. G. JACOBI　　　　3,464,647
PORTABLE CABLE REEL
Filed April 2, 1968
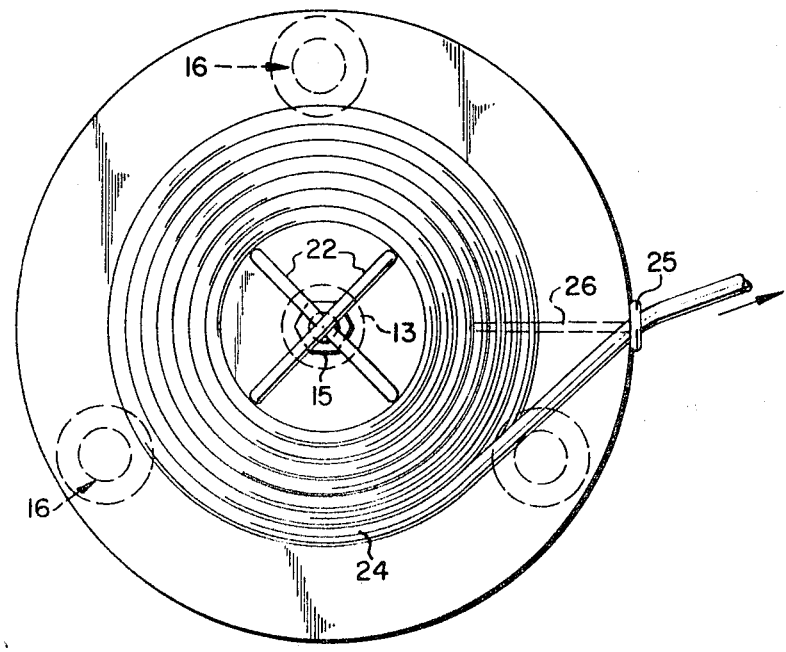
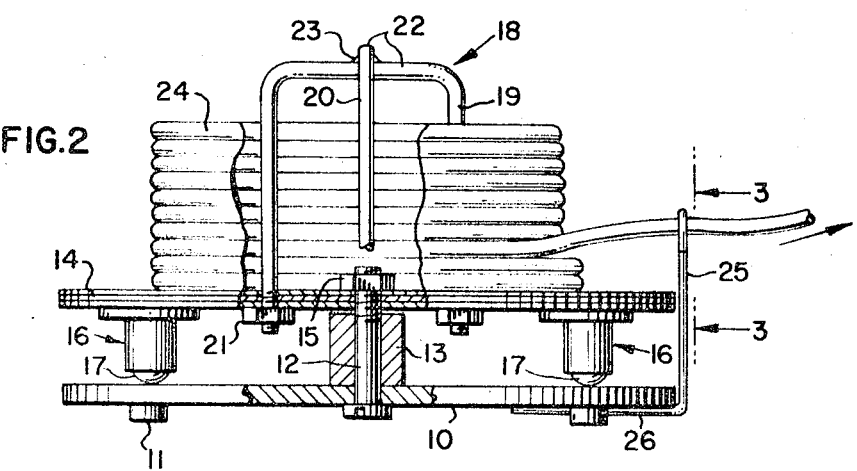
INVENTOR.
CHARLES G. JACOBI
BY *F. Ledermann*
ATTORNEY 3,464,647
PORTABLE CABLE REEL
Charles G. Jacobi, 223 Overpeck Ave.,
Ridgefield Park, N.J. 07660
Filed Apr. 2, 1968, Ser. No. 718,054
Int. Cl. B65h 49/36, 75/00
U.S. Cl. 242—129            4 Claims

ABSTRACT OF THE DISCLOSURE

A horizontal cable reel device whose axis is vertical, consisting of a base adapted to be set on a floor or other substantially or approximately horizontal support; a single parallel disc or sheave rotatably mounted above the base and having casters riding on the base; an upstanding reel core on the sheave adapted to have a cable wound thereon with the cable resting on the sheave; and an eyelet upstanding from the base adjacent the circumferential edge of the sheave, through which the cable is adapted to be led. The horizontal turns of the cable can be unwound from the reel without danger of undue bending or kinking.

---

An embodiment of the invention is illustrated in the accompanying drawing, wherein:

FIG. 1 is a top plan view of the device;

FIG. 2 is an elevational view of the device, with parts broken away and partly in section; and FIG. 3 is a sectional view taken on the line 3—3 of FIG. 2.

Referring in detail to the drawing, the numeral 10 designates a preferably disc-shaped base having a flat top surface, relatively short legs or the like 11. An axial pin, threaded stem, screw or the like 12 extends upward through the base and passes through a spacer collar or sleeve 13. A single disc or sheave 14 whose top surface, at least, is flat has an axial passage through which the screw 12 extends, and a nut 15 threaded on the screw and screwed down upon the sheave constrains the sheave from separating from the base.

Depending from the sheave 14 art shown three circumferentially spaced casters 16 containing balls 17 which ride upon the base 10. It will be noted in FIG. 2 that the upper end of the collar 13 is shown exaggeratedly spaced below the sheave, to emphasize that there is a clearance between the collar and the sheave so that the sheave turns freely on the collar and is supported primarily on the casters 16. Thus, with no thrust bearing down on the collar friction is reduced so that the cable can be unwound with a minimum pull effort on its leading end.

The core of the reel is shown at 18 composed of two inverted U-shaped members or rods 19 and 20 lying in vertical planes at right angles to each other. These rods are secured to the sheave in any desired manner; for example, as shown, by nuts 21 screwed upon threaded extremities of the rods which extend through the sheave. Thus the wound cable rests on the flat top of the sheave 14. The top portions 22 of these members, which may be horizontal, as shown, are attached to each other at their midpoints by, for example, solder or welding 23. An upstanding guide or eyelet 25 is provided on the end of an L-shaped arm 26 shown extending from the underside of the base 10, with the eyelet positioned beyond the rim of the sheave and vertically spaced roughly or approximately intermediate the height of the core.

The device is intended primarily though not solely for electricians or others working with electric cables which are relatively heavy or stiff, such cables, for example, of lead-covered or BX types. It is of the utmost importance to avoid undue bending or kinking of such cables during installation, for obvious reasons.

Owing to the horizontal position of the reel and its free rotatability with three depending casters riding on a fixed steady base, the cable 24 which is wound about the core 18 and rests upon the top flat surface of the sheave, may readily be led through the eyelet 25 and unwound without undue bending or kinking. In fact, it is a simple matter for the electrician installer to unwind a considerable length of cable in order to, for example, pass it through holes bored through ceiling beams, without any undue bending or kinking. The instant reel is also of particularly efficient use when the installer is passing or lifting the cable upward between floors. When a common upright form of reel is used, that is, one having a horizontal core, it is usually necessary to have a second man at the reel to prevent the just unwound length of cable from sagging and kinking while the installer is handling the cable at a distance.

In all cases with the instant reel the installer can work alone, without requiring the help of a man at the reel, even when the end of the cable is at a very substantial distance from the reel. Further, the entire device may be conveniently carried in a truck in its normal position, without requiring any auxiliary means such as is necessary to prevent reels whose axes are horizontal from rolling along the floor of the truck. Nor is any auxiliary support required, as is the case with vertical reels, for rotational mounting of the reel to permit unwinding of the cable.

It is to be noted that all the installer need do is to set the instant device in any convenient location on a floor or other suitable surface with the eyelet 25 facing in the general direction toward which the cable is being drawn.

The invention having thus been described, what is claimed is as follows:

1. A portable cable reel consisting of a flat topped circular base and a disc-shaped flat topped reel sheave parallel and coaxial with said base spaced above said base, an axial pivot pin extending upward from said base through said sheave, three equidistantly circumferentially spaced cylindrical casters depending from said sheave, balls fitted in the lower ends of said casters for riding on said base, a reel core extending upward from said sheave, and an upstanding guide eyelet secured to said base and extending upward above said sheave to a level approximately intermediate the height of said core, said eyelet being spaced radially outward from the circumferential edge of said sheave, the device being adapted to have a cable wound about said core and resting on said sheave and to have the leading end of the cable pass through said eyelet.

2. A portable cable reel according to claim 1, said core comprising two inverted U-shaped members positioned in vertical planes at right angles to each other, the top portions of said members being fixedly secured to each other at their midpoints, the lower ends of said members being threaded and extending through said sheave, and nut means for securing said threaded ends of said members to said sheave.

3. A portable cable reel according to claim 1, having a spacer collar surrounding said pin between said base and said sheave with clearance provided between the upper end of said collar and said sheave.

4. A portable cable reel according to claim 1, said base having support legs extending from the underside thereof.

References Cited

UNITED STATES PATENTS

| | | | |
|---|---|---|---|
| 1,147,680 | 7/1915 | Crawford | 242—129 |
| 3,168,262 | 2/1965 | Germain | 242—129 |
| 3,371,885 | 3/1968 | Douglas | 242—129 |
| 3,273,823 | 9/1966 | Taylor | 242—129 |

LEONARD D. CHRISTIAN, Primary Examiner